(12) United States Patent  
Kong

(10) Patent No.: US 9,035,750 B2
(45) Date of Patent: May 19, 2015

(54) METHOD AND SYSTEM FOR STATE ENCODING

(71) Applicant: SHELL OIL COMPANY, Houston, TX (US)

(72) Inventor: James Po Kong, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/149,584

(22) Filed: Jan. 7, 2014

(65) Prior Publication Data

US 2014/0240095 A1 Aug. 28, 2014

Related U.S. Application Data

(63) Continuation of application No. 12/664,103, filed as application No. PCT/US2008/067116 on Jun. 16, 2008, now Pat. No. 8,643,471.

(60) Provisional application No. 60/944,286, filed on Jun. 15, 2007.

(51) Int. Cl.
*G06K 7/10* (2006.01)
*G05B 23/02* (2006.01)

(52) U.S. Cl.
CPC ........ *G06K 7/10009* (2013.01); *G05B 23/0229* (2013.01)

(58) Field of Classification Search
CPC .................................................. G05B 23/0229
USPC ........................ 340/10.1, 506, 517, 521–523, 340/870.1–870.38, 850, 539.1, 340/539.22–539.29; 714/100
See application file for complete search history.

(56) References Cited

U.S. PATENT DOCUMENTS

| | | | |
|---|---|---|---|
| 4,559,610 A | 12/1985 | Sparks et al. | |
| 4,561,402 A | 12/1985 | Nakano et al. | |
| 5,437,254 A | 8/1995 | Korenaga et al. | |
| 5,461,311 A | 10/1995 | Nakazato et al. | |
| 6,292,757 B1 | 9/2001 | Flanagan et al. | |
| 6,453,265 B1 | 9/2002 | Dekhil et al. | |
| 6,646,564 B1 | 11/2003 | Azieres et al. | |
| 6,748,341 B2 | 6/2004 | Crowder | |
| 7,044,373 B1 | 5/2006 | Garber et al. | |
| 7,123,151 B2 | 10/2006 | Garber et al. | |
| 2001/0053940 A1 | 12/2001 | Horn et al. | |

(Continued)

FOREIGN PATENT DOCUMENTS

| EP | 1489474 A2 | 12/2004 |
|---|---|---|
| GB | 2414560 A1 | 11/2005 |

(Continued)

OTHER PUBLICATIONS

General Electric, website page entitled "System 1® Software", date unknown (copyright 1997-2010?), http://www.geenergy.com/prod_serv/products/oden/system_soft.htm, pp. 1 to 3 of printout.

(Continued)

*Primary Examiner* — Brian Zimmerman
*Assistant Examiner* — Bhavin M Patel

(57) ABSTRACT

A system comprising at least one piece of equipment; a plurality of sensors adapted to measure one or more operating parameters of the equipment; and a signature generator adapted to encode a plurality of data streams from the sensors into an operating signature for the equipment.

3 Claims, 9 Drawing Sheets

(56) References Cited

U.S. PATENT DOCUMENTS

| | | | |
|---|---|---|---|
| 2002/0067361 A1* | 6/2002 | Rennert et al. | 345/441 |
| 2002/0183971 A1 | 12/2002 | Wegerich et al. | |
| 2004/0153437 A1 | 8/2004 | Buchan | |
| 2005/0007249 A1 | 1/2005 | Eryurek et al. | |
| 2005/0007826 A1 | 1/2005 | Boggs et al. | |
| 2005/0049832 A1 | 3/2005 | Gorinevsky | |
| 2005/0114743 A1* | 5/2005 | Moorhouse | 714/100 |
| 2005/0159922 A1 | 7/2005 | Hsiung et al. | |
| 2005/0205037 A1 | 9/2005 | Lewis et al. | |
| 2005/0267702 A1 | 12/2005 | Shah et al. | |
| 2008/0016353 A1 | 1/2008 | Carro | |
| 2008/0129507 A1 | 6/2008 | Doan et al. | |

FOREIGN PATENT DOCUMENTS

| | | |
|---|---|---|
| WO | 0286726 A1 | 10/2002 |
| WO | 2005108744 A1 | 11/2005 |
| WO | 2006093746 A2 | 9/2006 |

OTHER PUBLICATIONS

General Electric, website page entitled "Condition Monitoring Solutions for Reciprocating Compressors", date unknown (copyright 1997-2010?), http://www.ge-energy.com/prod_serv/products/oc/en/bently_nevada/condition_solutions.htm, pp. 1 to 2 of printout.

General Electric, "Petroleum Refining", date unknown ( © 2010), http://www.geenergy.com/prod_serv/products/oc/en/downloads/GEA17985A_8.25x11_LR.pdf, pp. 1-12.

General Electric, website page entitled "Bently PERFORMANCETM", date unknown (copyright 1997-2010?), http://www.ge-energy.com/prod_serv/products/oc/en/opt_diagsw/bently_performance.htm, pp. 1 to 2 of printout.

General Electric, "Decision Support Studio*/Developer Edition", date unknown (rev. Feb. 2005?), http://www.geenergy.com/prod_serv/products/oc/en/downloads/decision_support_se_gea_13912b.pdf, pp. 1-2.

General Electric, "RulePaks", date unknown (rev. Feb. 2005?), http://www.geenergy.com/prod_serv/products/oc/en/downloads/rulepaks_se_gea_13910b.pdf, pp. 1-2.

General Electric website page entitled "Bently NevadaTM Machinery Diagnostic Services", date unknown (copyright 1997-2010?), http://www.ge-energy.com/prod_serv/products/oc/en/condition_monitoring/machinery_diag.htm, pp. 1-2.

PCT International Search Report, Application No. PCT/EP2008/067116 dated Sep. 8, 2008.

* cited by examiner

300
Encode Key sets
for Equipment X

| | Low Range Encode Key | High Range Encode Key | |
|---|---|---|---|
| Encode Key Set 1: encodes Unprocessed State Detector Data from State Detector sd1 | 5.759 | 5.963 | 302 Encode Key Set 1 |
| Encode Key Set 2: encodes Unprocessed State Detector Data from State Detector sd2 | 35 | 96 | 304 Encode Key Set 2 |
| Encode Key Set 3: encodes State Detector Data from State Detector sd3 – State Detector Data from State Detector sd2 | -352 | 48 | 306 Encode Key Set 3 |
| Encode Key Set 4: encodes Unprocessed State Detector Data from State Detector sd4 | 96.3 | 165.8 | 308 Encode Key Set 4 |

FIGURE 8A

310
Patterns

| Failure detected | Pattern | Action | |
|---|---|---|---|
| Failure Type 1 | 00111000 | Email Operator | 310 Pattern 1 |
| Failure Type 2 | 00000001, 00100001, 10100001 | Stop Equipment | 312 Pattern 2 |
| Failure Type 3 | 00000010, 8 times within 12 minutes | Replace Valve | 314 Pattern 3 |

FIGURE 8B

METHOD AND SYSTEM FOR STATE ENCODING

CROSS-REFERENCE TO RELATED APPLICATIONS

This application is a continuation of U.S. patent application Ser. No. 12/664,103 filed on May 4, 2010. This application claims the benefit, pursuant to 35 U.S.C. §120, of the aforementioned application. U.S. patent application Ser. No. 12/664,103 is a national phase application of PCT/US08/67116 filed on Jun. 16, 2008. PCT/US08/67116 claims benefit, pursuant to 35 U.S.C. §365, of U.S. Provisional Application Ser. No. 60/944,286 entitled "REMOTE MONITORING SYSTEMS AND METHODS," filed on Jun. 15, 2007 in the name of James Kong. All of the aforementioned applications are incorporated by reference in their entirety.

BACKGROUND

U.S. Patent Application Publication 2008/0129507 discloses a method for employing radio frequency (RF) identifier (ID) transponder tags (RFID tags) to create a unique identifier, termed an RFID signature, for use within a data processing system with respect to a person or an object. An interrogation signal is transmitted toward a person or an object with which a set of one or more RFID tags are physically associated. A first set of RFID tag identifiers are obtained from an interrogation response signal or signals returned from the set of one or more RFID tags. A mathematical operation is performed on the first set of RFID tag identifiers to generate an RFID signature value, which is employed as an identifier for the person or the object within the data processing system with respect to a transaction that is performed by the data processing system on behalf of the person or the object. U.S. Patent Application Publication 2008/0129507 is herein incorporated by reference in its entirety.

U.S. Patent Application Publication 2008/0016353 discloses a method and system for verifying the authenticity and integrity of files transmitted through a computer network. Authentication information is encoded in the filename of the file. In a preferred embodiment, authentication information is provided by computing a hash value of the file, computing a digital signature of the hash value using a private key, and encoding the digital signature in the filename of the file at a predetermined position or using delimiters, to create a signed filename. Upon reception of a file, the encoded digital signature is extracted from the signed filename. Then, the encoded hash value of the file is recovered using a public key and extracted digital signature, and compared with the hash value computed on the file. If the decoded and computed hash values are identical, the received file is processed as authentic. U.S. Patent Application Publication 2008/0016353 is herein incorporated by reference in its entirety.

SUMMARY

One aspect of the invention provides a system comprising at least one piece of equipment; a plurality of sensors adapted to measure one or more operating parameters of the equipment; and a signature generator adapted to encode a plurality of data streams from the sensors into an operating signature for the equipment.

Another aspect of the invention provides a method comprising identifying at least one piece of equipment to be monitored; installing a plurality of sensors to measure operating data of the equipment; establishing an operating range for each of the sensors; and creating an encoding key for each of the ranges.

Other aspects of the invention will be apparent from the following description and the appended claims.

BRIEF DESCRIPTION OF DRAWINGS

FIGS. 8A-8B show an example in accordance with one or more embodiments of the invention.

DETAILED DESCRIPTION

Figure 1:
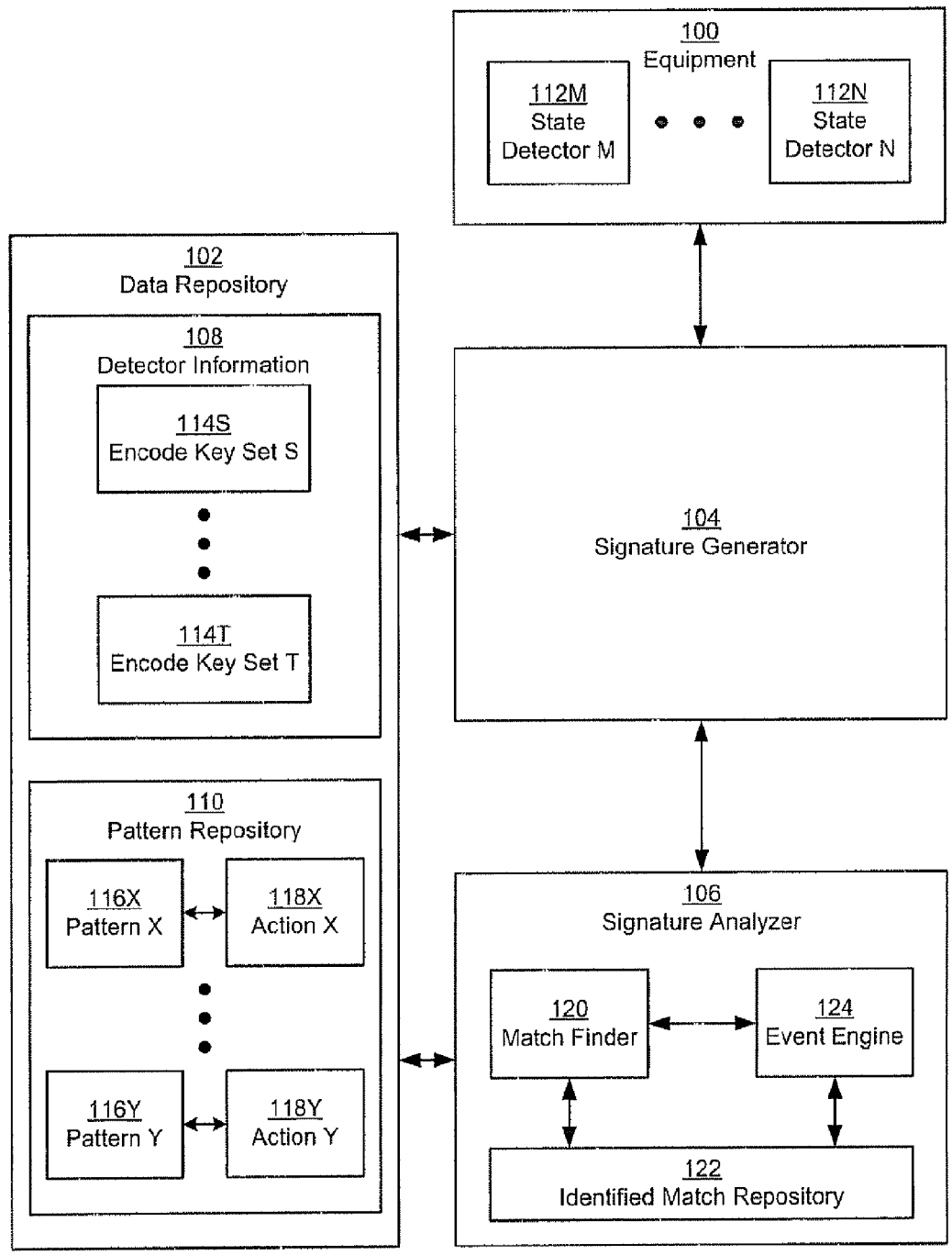
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for analyzing equipment using encoded data obtained from the equipment. The data represents the operational conditions of the equipment. The operational conditions may define both conditions internal to the equipment, such as how well the equipment is operating, as well as conditions external to the equipment, such as the environment in which the equipment is operating. State detectors monitoring the equipment are used to obtain unprocessed state detector data values representing the operational conditions. Unprocessed state detector data values from different state detectors may be processed, such as by being mathematically combined, to create processed state detector data values. The different state detector data values, including processed and/or unprocessed state detector data values, are encoded. The encoding is based on whether the value is in a predefined range of values. The ranges are defined based on acceptable limits for the equipment. For example, the range may include a high range, an above normal range, a normal range, a below normal range, and a low range. If value is within the range, then one or more bits are set to indicate that the value is within the range. The bits are concatenated to generate a signature. Thus, the single signature represents the state of the equipment at a moment in time. Specifically, a single signature concisely represents which processed and/or unprocessed state detector data values are within acceptable limits and which state detector data values are outside of acceptable limits.

One or more signatures may be compared with stored patterns of signatures. A pattern associates the occurrence of one or more classified or known signatures with a definition of how the equipment is functioning. Specifically, when one or more generated signatures matches the classified signatures in a pattern, then the equipment is determined to be functioning as defined by the pattern. Thus, by comparing one or more generated signatures with known patterns of signatures, embodiments of the invention may be used to evaluate the state of the equipment.

FIG. 1:

FIG. 1 shows a schematic diagram of a system in accordance with one or more embodiments of the invention. In one or more embodiments of the invention, the system includes equipment (100), a data repository (102), a signature generator (104), and a signature analyzer (106). Each of these components is described below.

Equipment (100) corresponds to the physical devices that are being monitored. For example, the equipment (100) may include gearboxes, compressors, pumps, lubricating systems, as well as other such equipment. In one or more embodiments of the invention, the equipment includes functionality to perform oilfield operations. In one or more embodiments of the invention, each piece of equipment is represented by separate signatures. Further, one piece of equipment may be a component of another piece of equipment. For example, one piece of equipment may correspond to a compressor while another piece of equipment corresponds to a bearing in the compressor. In such a scenario, one series of signatures (i.e., signatures generated from state detector data obtained at different moments in time) may represent the compressor with the bearing while another series of signatures represents only the bearing.

In one or more embodiments of the invention, the equipment (100) is monitored by state detectors (112). Each state detector (112) includes functionality to obtain unprocessed state detector data. The state detector (112) may be a sensor, a person monitoring the equipment, or any other monitoring unit that obtains data about the operations conditions. For example, state detector M (112M) may be a temperature sensor while state detector N (112N) detects the composition of fluid from the oilfield.

The state detector data represents operational conditions of the equipment. An operational condition includes internal or external conditions under which the equipment is operating. For example, the operational condition may include temperature, pressure, composition, health of the equipment, performance of the equipment, and other such data. The state detector data may include unprocessed state detector data and/or processed state detector data. Unprocessed state detector data corresponds to data obtained directly from the equipment, such as temperature, pressure, flow, density, viscosity. Processed state detector data corresponds to data calculated from the unprocessed state detector data, such as changes in temperature, the difference between inlet and outlet pressure, efficiency, and other such calculated data. Thus, processed state detector data may represent the combination of state detector data values from different pieces of equipment. In one or more embodiments of the invention, each state detector data value in the combination is collected at the same moment in time or within a defined period of time.

In one or more embodiments of the invention, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. For example, a portion of the data repository (102) may be on an internal server while another portion is distributed across the Internet. In one or more embodiments of the invention, the data repository (102), or a portion thereof, is secure. In one or more embodiments of the invention, the data repository (102) includes detector information (108) and a pattern repository (110). The detector information (108) and the pattern repository (110) are discussed below.

Detector information (108) includes an encode key set (114) for units of processed and unprocessed state detector data. For example, an encode key set S (114S) may correspond to state detector M (112M) while encode key set T (114T) corresponds to processed state detector data defining the performance of the equipment (100). An encode key set (114) includes one or more encode keys. Each encode key defines a mapping between the possible values of the state detector data and a bit value in the signature. Specifically, the encode key assigns a range of possible values or a discrete group of possible values of the state detector data to a value of a bit in the signature. The encode keys are discussed in further detail below.

Continuing with FIG. 1, a signature generator (104) includes functionality to generate a signature using the detector information (108). As discussed above, a signature represents the state of the equipment at a moment in time. Specifically, the signature includes the encoded processed and unprocessed state detector data values obtained from the state detectors (112). The signature is discussed below and in FIG. 2.

Continuing with FIG. 1, the data repository (102) may also include a pattern repository (110). A pattern repository (110) is a storage unit for patterns (116) of classified signatures. A pattern associates the occurrence of one or more classified signatures with a definition of how the equipment is functioning. A classified signature is any signature in a defined pattern. The patterns may be used to evaluate the signature. When generated signatures match a pattern, the equipment is determined to be performing as defined by the pattern. The patterns (116) may be used to detect failure or a potential for failure in the equipment, the type of failure, the general condition of the equipment, how well the equipment is processing, as well as other uses. Patterns are discussed below and in FIGS. 3A-3C.

Continuing with FIG. 1, each pattern (116) in the pattern repository (110) may have a corresponding action (118). The action (118) defines the steps to perform when the pattern is detected. For example, the action (118) may define parts of the equipment to replace, adjustments to make to the equipment, as well as other actions to perform. Further, the action (118) may define a degree of urgency to perform the steps of the action and consequence of delaying or not performing the action.

In addition to the detector information (108) and the pattern repository (110), the data repository (102) may also include a repository (not shown) for state detector data. For example, the processed and unprocessed state detector data may be stored in the repository. In one or more embodiments of the invention, generated signatures are stored in the repository. The repository of state detector data may be used, for example, to create or modify encode key sets and patterns in the data repository (102). For example, the repository of state detector data may be used to create a pattern for detecting a newly discovered type of failure of the equipment.

Continuing with FIG. 1, the signature analyzer (106) includes functionality to evaluate the equipment by analyzing the generated signatures. The signature analyzer (106) includes a match finder (120), identified matches (122), and an event engine (124). The match finder (120), identified matches (122), and the event engine (124) are discussed below.

The match finder (120) includes functionality to identify when one or more generated signatures match the patterns in the pattern repository (110). Specifically, the match finder (120) includes functionality to determine whether a signature generated by the signature generator (104) matches a classified signature in a pattern (116). Further, the match finder (120) includes functionality to determine whether an entire pattern is matched by one or more generated signatures.

Identified match repository (122) is a storage repository for generated signatures that match classified signatures in a pattern. Specifically, the identified match repository (122) may store signatures while the match finder (120) determines whether the generated signatures match a pattern (116). In one or more embodiments of the invention, the identified matches are stored with the patterns that may be potentially matched. For example, consider the scenario in which a pattern requires that seven specific signatures are generated within a specific duration. The first six signatures that match six classified signatures in the example pattern are stored in the identified match repository (122) with identification of the example pattern. When the seventh generated signature is analyzed, the match finder may access the identified match repository (122) to determine whether the six previously generated signatures with the seventh generated signature match the example pattern in the required duration.

In one or more embodiments of the invention, the event engine (124) includes functionality to perform the action (118) and/or generate an alert when the pattern is matched. Specifically, the event engine (124) may include functionality to control the equipment to perform the action (118). Alternatively, or additionally, the event engine (124) may include functionality to generate an alert, such as create an auditory alarm, send an email or text message to an operator, display a warning message, or perform any other steps defined by the action.

Figure 2A:
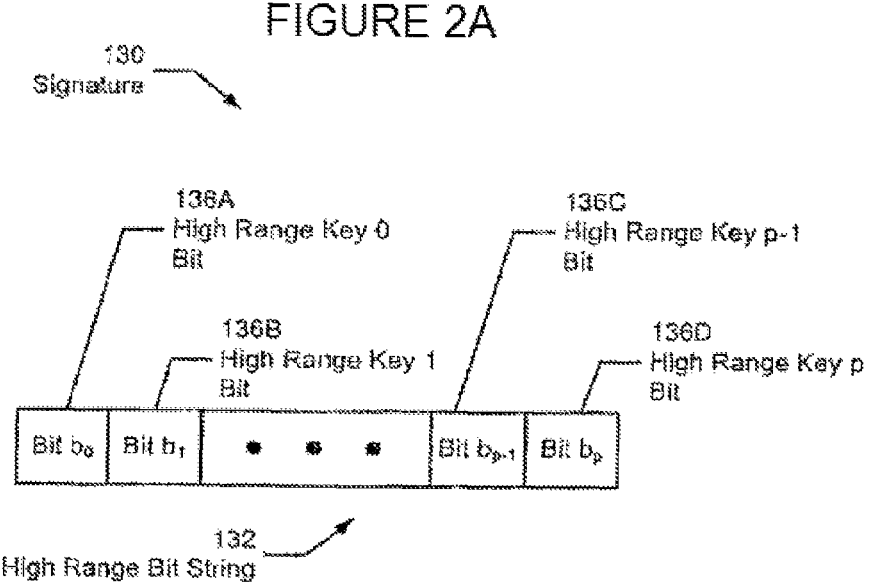
FIGS. 2A and 2B show an example schematic diagrams of a signature in accordance with one or more embodiments of the invention.
Figure 2B:
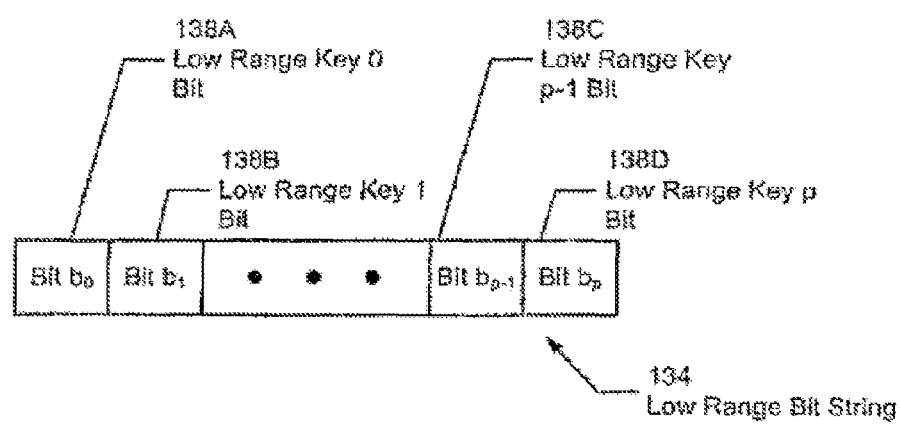

FIGS. 2A and 2B:

FIGS. 2A and 2B show an example signature (130) in accordance with one or more embodiments of the invention. The following is for exemplary purposes only and not intended to limit the scope of the invention. In one or more embodiments of the invention, the data type of the signature (130) is an unsigned Big Int. A Big Int has sixty-four bits that are stored as a single block of data. An unsigned Big Int represents integer values of 0 to $2^{64}$-1. In one or more embodiments of the invention, the signature (130) is a concatenation of four Big Ints. Those skilled in the art will appreciate that different sizes of the signature and different data types may be used without departing from the scope of the invention.

In FIG. 2A and 2B, the signature (130) includes bit strings for encoding a high range, a normal range, and a low range. Specifically, when a state detector data value is in the high range, a bit may be set to "1" in the high range bit string (132) with the corresponding bit set to "0" in the low range bit string. When the state detector data value is in the low range, a bit may be set to "1" in the low range bit string (134) with the corresponding bit set to "0" in the high range bit string. A state detector data value that is in the normal range has the bit set to "0" in the high range bit string (132) and "0" in the low range bit string (134).

As discussed above, the encoding of state detector data values is performed by an encode key that maps the value to bits in the bit string. Each encode key in the encode key set has a corresponding position for a bit (136, 138) in the signature (130) in the corresponding range. For example, high range keys have corresponding high range key bits (136) in the high range bit string (132) while low range keys have corresponding bits (138) in the low range bit string (134). For example, state detector data encoded by encode key set 1 is encoded in high range key 1 bit (136B) and in low range key 1 bit (138B). Thus, two bits in the signature (130) are used to represent the three possible ranges.

Encode keys may be defined as a single numeric value and a bit position. In particular, the high range encode key may be defined by the high number in which all values above the high number are in the high range. Conversely, the low range encode key may be defined by the low number in which all values below the low number are in the low range. For example, state detector data values above the value of the high range key are in the high range and therefore are encoded as a "1" in the high range key bit (136). Similarly, state detector data values below the low range key are in the low range and therefore are encoded as a "1" in the low range key bit (138). State detector data values that are lower than the high range key and higher than the low range key are in the acceptable range and may be encoded as a "0" in the high range key bit (136) and as a "0" in the low range key bit (138).

For the following example, consider the scenario in which the high range is above 295, the low range is below 225, and the normal range is between 225 and 295. In the example, a high range key may define that state detector data having a value above 295 is encoded as a "1" for the high range bit. Further, in the example, a low range key may define that state detector data having a value below 225 is encoded as a "1" for the low range bit. Thus, in the example, a state detector data value of 312 is assigned a "1" for the high range bit and a "0" for the low range bit.

As discussed above, FIGS. 2A and 2B is only an example of one possible format for the signature. Alternative variations for the format of the signature may be used. Below is a discussion of some of the different variations that may not be represented directly in FIG. 2A and 2B.

In a first variation, a different encoding than discussed above may be used. Specifically, a value of "0" may be used to represent when the state detector data value is in the range specified by the bit. For example, rather than using a value of "1", a value of "0" in the high range key bit may represent when the state detector data value is above the high range key.

In another variation, although FIGS. 2A and 2B shows only two bit strings, additional bit strings may be used to represent additional ranges. For example, consider the scenario in which the data is to be encoded into a low range, a below normal range, a normal range, an above normal range, and a high range. In the example, the five different ranges may be represented by three or four bits depending on the encoding. For example, using the encoding discussed above, four bits may be used. Each of the four bits represents whether the state detector data value is one of the four abnormal ranges. Alternatively, three bits may be used to represent the five ranges. In such an alternative, more than one of the three bits may be "1" in the generated signature. For example, the following encoding may be used for the state detector data value: "000" represents normal range, "001" represents below normal range, "011" represents low range, "100" represents above normal range, and "110" represents high range.

In another variation, rather than identifying whether the state detector data value is within a range of values, an encode keys may be used to specify when the value is a member of a discrete set of values. In such scenario, rather than having a high range key bit and a low range key bit, the signature may have a single bit that represents whether the value of the state detector data is in the set. For example, consider the scenario in which the discrete set of values is X1, X2, X3, X4, and X5. A value of "1" may be used to represent when the value of the state detector data is either X1, X2, X3, X4, or X5 while a value of "0" may be used to represent when the value of the state detector data is not X1, X2, X3, X4, or X5. Thus, in the example, X3 maps to "1" while X7 maps to "0" as defined by the encode key set.

In another variation of FIGS. 2A and 2B, the number of encode keys in the encode key set may not be uniform. Thus, the number of bits in the high range bit string may be different from the number of bits in the low range bit string. For example, consider the scenario in which a first portion of the state detector data have four corresponding encode keys (e.g., to represent a low range, a below normal range, a normal range, an above normal range, and a high range), a second portion has two corresponding encode keys (e.g., to represent a low range, a normal range, and a high range), and a last portion have a single encode key (e.g., to represent when the value of the state detector data is in the set represented by the encode key). In the example scenario, the signature may have five bit strings (e.g., a low range bit string, a below normal range bit string, an above normal bit string, a high range bit string, and a single set bit string). The low range bit string and the high range bit string may have bits for both the first portion and the second portion of the state detector data. The below normal bit string and above normal bit string may have bits for only the second portion of state detector data. The single set bit string may have bits for the last portion of state detector data.

In another variation, virtually any configuration of bits in the signature may be used. For example, although FIGS. 2A and 2B shows having a high range bit string and a low range bit string, bit positions for encode keys in the same encode key set may be adjacent. As an example, bits that encode temperature may be adjacent rather than in separate bit strings.

Further, although FIGS. 2A and 2B shows the bit strings as separated, the bit strings may be concatenated to form the signature. Specifically, bit $b_p$ in the high range bit string (132) may immediately precede bit $b_0$ in the low range bit string (134). Thus, the signature may be the concatenation of the bit strings.

Further, although FIGS. 2A and 2B shows the signature as a bit string, those skilled in the art will appreciate that the signature, when presented to the user, may be the numeric value of the bit string. Specifically, each bit string has a unique numeric value for the data type. For example, the bit string "00000110" in the unsigned byte data type represents the value of six.

Those skilled in the art will appreciate that the above is only a few of the possible variations of the signature. Different variations maybe used without departing from the scope of the invention.

Figure 3A:
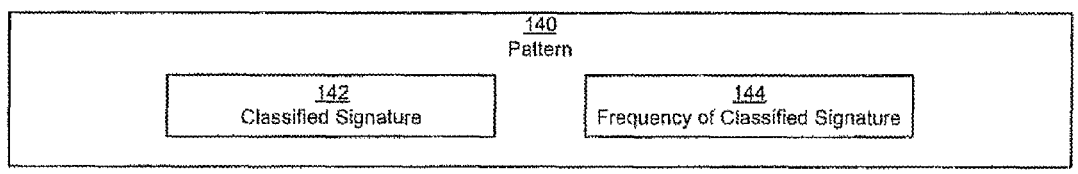
FIGS. 3A, 3B, and 3C show patterns in accordance with one or more embodiments of the invention.
Figure 3B:
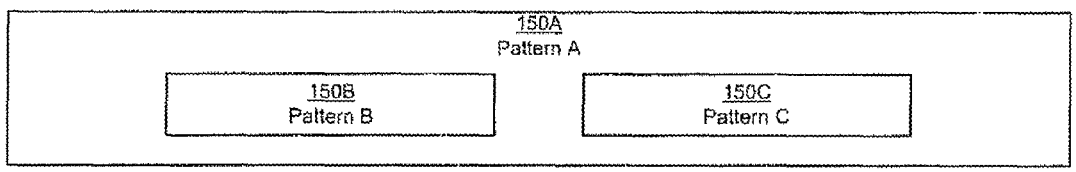

FIGS. 3A-3C:

FIGS. 3A-3B show example patterns in accordance with one or more embodiments of the invention. A pattern associates the occurrence of one or more signatures with a definition of how the piece of equipment is functioning As shown in FIG. 3A, a pattern (140) may include a classified signature (142) and a frequency of the classified signature (144) in accordance with one or more embodiments of the invention.

A classified signature (142) is a pre-defined signature that is previously associated with a pattern. Thus, the configuration of encode key bits in the classified signature (142) is the same as the configuration in a generated signature. In one or more embodiments of the invention, the frequency of the classified signature (144) defines the number of signatures matching the classified signature (142) that must be generated within a specified duration before the equipment is evaluated as functioning as defined by the pattern.

For the following example, consider the scenario in which the frequency of the classified signature is four of the classified signatures in three minutes. In the example, the first time that a signature is generated which matches the classified signature, the signature analyzer may be undecided whether the equipment is functioning as defined by the pattern or whether faulty data is obtained. If three additional matching signatures are generated within the three minutes, then the equipment may be evaluated to be functioning as defined by the pattern. The pattern may or may not require that the signatures are consecutively generated.

As shown in FIG. 3B, patterns (150) may be nested in accordance with one or more embodiments of the invention. Specifically, a pattern (150) may include one or more patterns. For example, as shown in FIG. 3B, pattern A (150A) includes pattern B (150B) and pattern C (150C). Pattern B (150B) and pattern C (150C) may be any of the patterns represented in FIGS. 3A-3C.

Figure 3C:
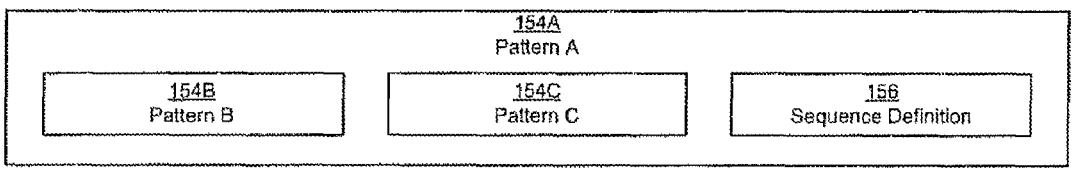

Further, as shown in FIG. 3C, in addition to nested patterns, a pattern (154A) may also include a sequence definition (156). The sequence definition (156) defines an ordering between the nested patterns (154B, 154C). Specifically, the sequence definition (156) defines whether pattern B (154B) precedes or succeeds pattern C (154C) before a state of the equipment is detected. Additionally, the sequence definition may describe the number of times each of the nested patterns is generated.

Using the pattern definitions described in FIGS. 3A-3C, an example pattern is: "<signature A>, <signature B>, <frequency of signature B=2>, <sequence definition: signature A precedes signature B><signature C>". While the example shows one technique for defining a pattern, many different techniques may be used. For example, the example pattern definition may be stored as previously described or as "<signature A>, <signature B>, <signature B>, <signature C> and <signature C> <signature A>, <signature B>, <signature B>".

FIGS. 4-7:

FIGS. 4-7 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

Figure 4:
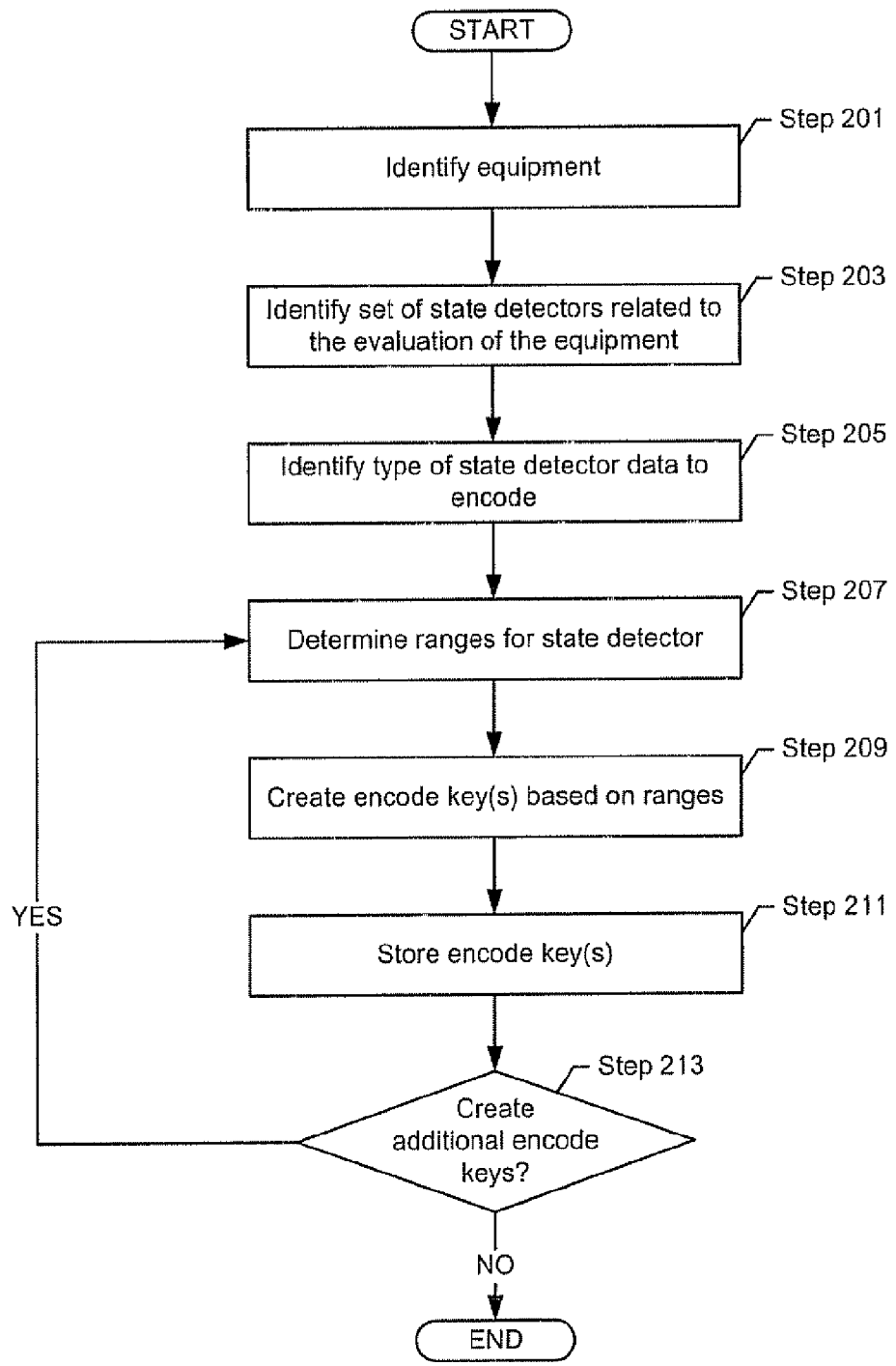
FIGS. 4-7 show flowcharts in accordance with one or more embodiments of the invention.

FIG. 4 shows a flowchart for generating encode keys in accordance with one or more embodiments of the invention. In one or more embodiments of the invention, patterns are defined separately for each piece of equipment. Each pattern is associated with a definition of how the piece of equipment is functioning. In step 201, the equipment is identified. A set of state detectors related to the evaluation of the equipment is identified in step 203. In one or more embodiments of the invention, the set of identified state detectors include all state detectors required to monitor and evaluate the equipment.

From the set of state detectors, the type of state detector data to encode is identified in Step 205. Specifically, the type of state detector data that is identified may be unprocessed state detector data obtained from a specific state detector. Alternatively, the type of state detector data that is identified may be processed state detector data that is created by performing a specific set of steps on unprocessed state detector data obtained from one or more state detectors. For example, the type of state detector data that is identified may be unprocessed data such as temperature, or processed data, such as the pressure drop between inlet and outlet pressure.

For the identified type of state detector data, the ranges of the state detector data values are identified in Step 207. In one or more embodiments of the invention, a determination is made as to the number of ranges to define for the state detector data. For each of the ranges, the boundaries of the range are identified. In one or more embodiments of the invention, the boundaries are identified from historical data, experience with the same or similar equipment, and/or specifications from the equipment manufacturer.

In step 209, encode keys are created based on the ranges. Specifically, the boundaries of each of the ranges are used to define the encode keys. Thus, a mapping is created between the boundaries of the ranges and values for the encode key bit. The encode keys are stored in Step 211. In one or more embodiments of the invention, an ordering of the encode key bits in the signature for the equipment is defined. Specifically, each encode key is assigned a position in the signature.

In step 213, a determination is made whether to create additional encode key sets. If a determination is made to create additional encode key sets, then the method repeats with Step 207.

Once encode keys exist, the configuration of the bits in the signature is defined. Thus, one or more patterns may be defined (not shown). In one or more embodiments of the invention, a pattern is defined based on the type of evaluation to perform for the equipment.

For the following example, consider the scenario in which the evaluation of the equipment is to detect failure or the potential for failure. In such an example, the different types of failure modes of the equipment are identified. For each of the different types of failure modes, the symptoms of the failure modes are identified. In particular, a determination is made as to the state detector data values from each state detector that typically exists prior to the failure associated with the failure mode. Based on the state detector data values and the encode keys, a classified signature is defined. The classified signature may be used to define the pattern. Specifically, a determination may be made as to the number of times in which signatures matching the classified signature is to be generated before the failure is detected. The number of times and the classified signature may be stored in the data repository as a pattern. If the type of failure mode requires a change in the state detector data values over time, then multiple classified signatures may be defined. In such a scenario, a pattern may be created by requiring that the multiple classified signatures occur in succession.

Figure 5:
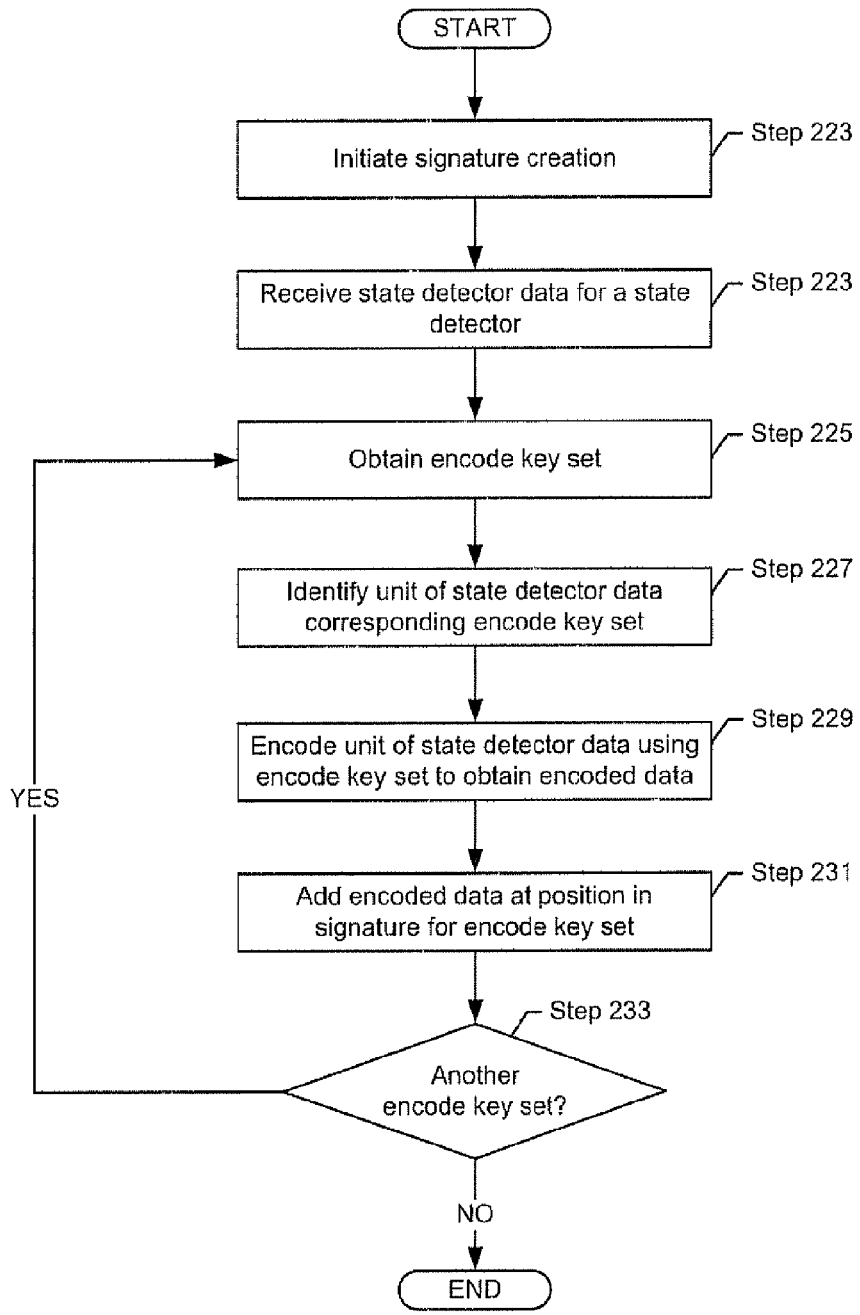

FIG. 5 shows a flowchart for generating a signature in accordance with one or more embodiments of the invention. As shown in FIG. 5, signature creation is initiated in Step 221. Specifically, an empty signature is defined.

In step 223, unprocessed state detector data is obtained from the state detectors. For example, sensors on the equipment may gather the state detector data from the equipment and store the state detector data in a data repository. The unprocessed state detector data may be processed to create processed state detector data. For example, the processing may include calculating changes in the operational state of the equipment using the unprocessed state detector data, calculating the performance of the equipment, and performing other such calculations. The processed state detector data may also be stored in the data repository.

In step 225, an encode key set is obtained. The unit of state detector data corresponding to the obtained code key set is identified in step 227. Specifically, an identification is made as to which state detector data is encoded by the encode key set. The values of the identified state detector data may be obtained from the data repository. Using the encode key set, the state detector data is encoded to obtain encoded data in step 229. The encoded data is added to the location in the signature specified by the encode key set (Step 231). In step 233, a determination is made whether another encode key set exists. If another encode key set exists, then the method may repeat with step 225. If no other encode key set exists, then the signature generation is complete.

Figure 6:
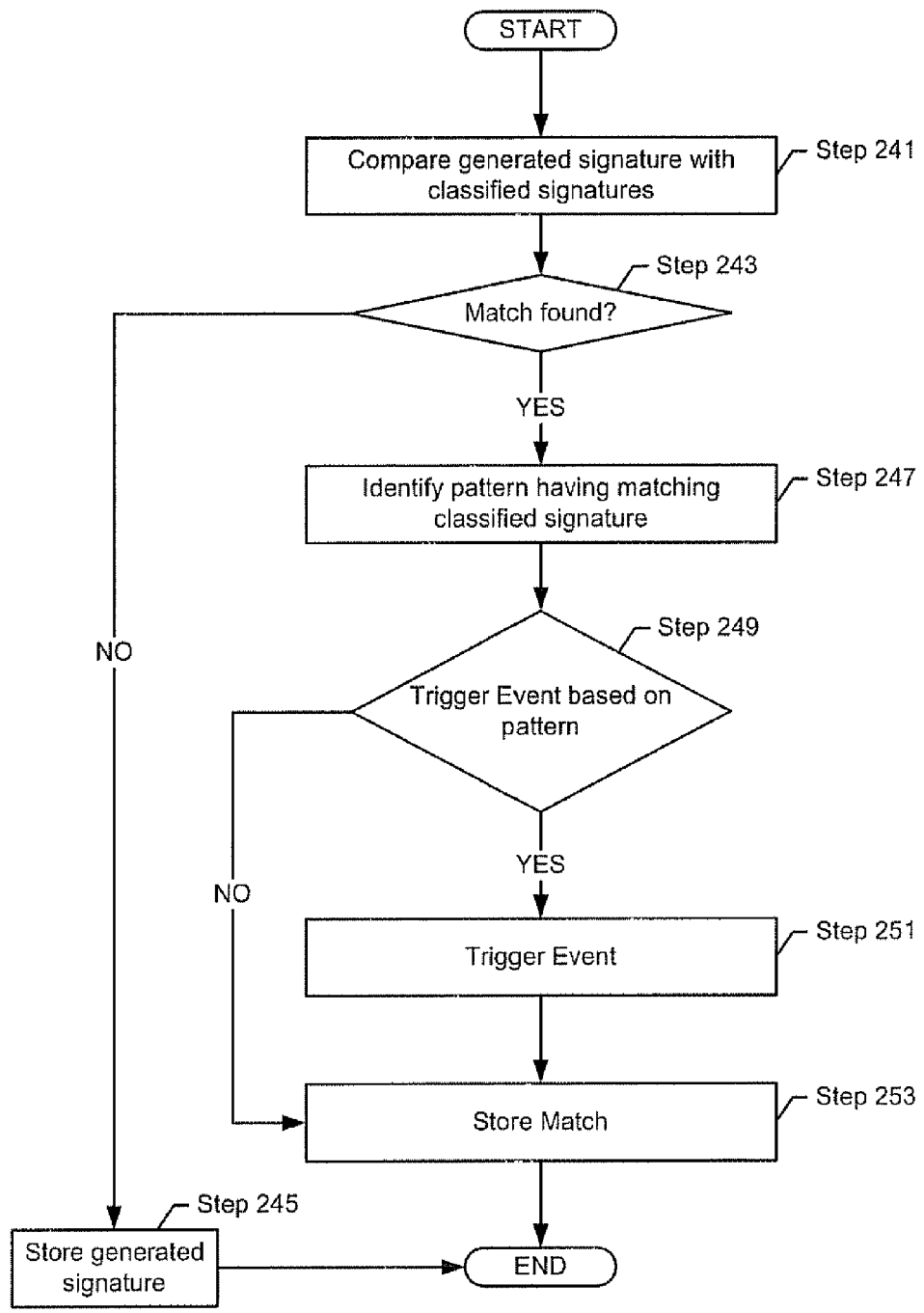

FIG. 6 shows a flowchart for determining whether generated signatures match a pattern in accordance with one or more embodiments of the invention. The generated signature is compared with classified signatures in the repository (Step 241). Specifically, the generated signatures are compared with each of the classified signatures in each pattern in the repository. Those skilled in the art will appreciate that multiple different methods for comparing signatures may be used without departing from the scope of the invention. For example, the comparison may be performed by performing a bitwise comparison. In another example, a determination may be made whether the number represented by the generated signature matches the number represented by a classified signature. If the number matches, then the signature matches. In step 243, a determination is made whether a match is found.

If a match is not found, then the generated signature is stored in accordance with one or more embodiments of the invention (Step 245). Storing the generated signature provides a historical record of the generated signatures. Using the historical record, new patterns may be learned in accordance with one or more embodiments of the invention.

If a match is found, then the pattern(s) having the classified signature that matches the generated signature identified in Step 247. In one or more embodiments of the invention, more than one pattern may be identified. Specifically, the same classified signature may be in multiple different patterns of signatures.

In one or more embodiments of the invention, a determination is made whether to trigger an event based on a pattern in step 249. An event is triggered when one or more generated signatures match a pattern.

In step 251, an event is triggered based on the determination. Specifically, the action corresponding to the matched pattern is identified. The steps of the action are performed. For example, an alert may be issued via email, text, or phone, or a message may be displayed that defines the state of the equipment. Further, rather than or in addition to triggering an alert, the event engine may automatically adjust the equipment according to the action. For example, the event engine may shut down the equipment, adjust flow of the equipment, adjust operating parameters of the equipment, or perform other actions.

Regardless of whether a determination is made to trigger an event, the newly identified match is stored. Specifically, the newly generated signature may be stored with identified matches. Further, the newly generated signature may be stored for learning additional patterns.

Figure 7:
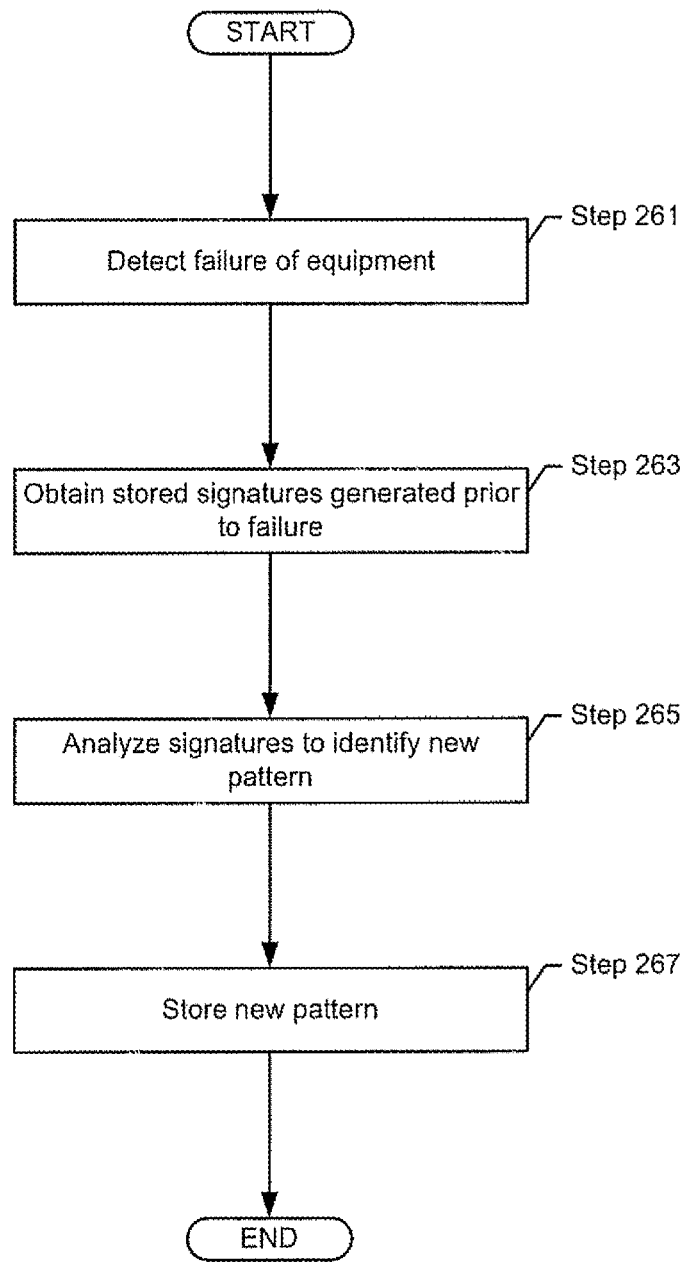

FIG. 7 shows a flowchart of a method for learning new patterns for failure detection in accordance with one or more embodiments of the invention. In step 261, a failure of the equipment is detected. In one or more embodiments of the invention, the failure of the equipment was not previously detected using the patterns. For example, an operator of the equipment may determine that the equipment is no longer functioning properly.

Stored signatures that were generated for the equipment prior to the failure are obtained in step 263. At this stage, the data repository is accessed to identify all signatures generated prior to the failure.

In step 265, the generated signatures are analyzed to identify a new pattern. Different methods may be used to analyze the generated signatures. For example, the analysis may include determining the symptoms of the failure that existed prior to the failure. Based on the symptoms, the state detector data that may identify the existence symptoms are identified. The encode key bits corresponding to the identified state detector data are identified. The identified encode key bits in the generated signatures are used to define a new pattern. In step 267, the new pattern is stored in the data repository.

FIGS. 8A-8B:

FIGS. 8A-8B show an example in accordance with one or more embodiments of the invention. The following is for exemplary purposes only and not intended to limit the scope of the invention. In the following hypothetical example, consider the scenario in which Equipment X is being monitored to prevent failure. Equipment X has four state detectors (i.e., sd1, sd2, sd3, sd4) gathering unprocessed state detector data from equipment X. Those skilled in the art will appreciate that, in actuality, many more state detectors may be gathering state detector data from equipment X.

FIG. 8A shows encode key sets for state detector data from Equipment X (300) in accordance with one or more embodiments of the invention. As shown in the example FIG. 8A, encode key set 1 (302) encodes unprocessed state detector data from state detector sd1. The low range encode key is 5.759 and the high range encode key is 5.963 in encode key set 1 (302). Encode key set 2 (304) encodes unprocessed state detector data from state detector sd2. The low range encode key is 35 and the high range encode key is 96 in encode key set 2 (304).

Encode key set 3 (306) encodes processed state detector data. Specifically, to obtain the processed state detector data value for encode key set 3 (306), the state detector data value from state detector sd2 is subtracted from the state detector data value from state detector sd3. The low range encode key for the processed state detector data is −352 and the high range encode key is 48 in encode key set 3 (304).

Encode key set 4 (308) encodes unprocessed state detector data from state detector sd4. The low range encode key is 96.3 and the high range encode key is 165.8 in encode key set 4 (308).

In the hypothetical example, the bits of each signature are in the following order: low range key bit for encode key 1, low range key bit for encode key 2, low range key bit for encode key 3, low range key bit for encode key 4, high range key bit for encode key 1, high range key bit for encode key 2, high range key bit for encode key 3, high range key bit for encode key 4.

Continuing with the hypothetical example, FIG. 8B shows example patterns for detecting a failure in accordance with one or more embodiments of the invention. In the example, the patterns may be used to detect three different types of failures. Specifically, pattern 1 (310) associates classified signature 00111000 with failure type 1. The operator is emailed when the classified signature in pattern 1 (310) is generated. Pattern 2 (312) associates classified signatures in a pattern of 00000001, 00100001, 10100001 with failure type 2. Equipment X is stopped when pattern 2 (312) is matched. Pattern 3 (314) associates classified signature 00000010 occurring eight times in twelve minutes with failure type 3. A valve is replaced when pattern 3 (314) is detected.

Continuing with the example, unprocessed state detector data is collected from the equipment. For example, at time $t_0$, 5.83 is obtained from sd1, 40 is obtained from sd2, −258 is obtained from sd3, and 179 is obtained from sd4. The state detector data for time $t_0$ is encoded using the encode keys in FIG. 8A. Specifically, 5.83 is in the normal range for encode key set 1. Therefore, 5.83 is encoded as 0 for the high range key bit and 0 for the low range key bit. 40 is also in the normal range for encode key set 2 and therefore is similarly encoded. Similarly, −258 40 equals −298 for encode key set 3 and is also in the normal range. However, 179 from sd4 is above normal and is therefore encoded as a 0 for the low range bit and a 1 for the high range bit. Accordingly, the signature generate for time $t_0$ is 00000001.

The generated signature 00000001 is compared with patterns in FIG. 8B . At this stage, the generated signature matches only one classified signature in pattern 2 (312). Because the pattern is not completely matched, no failure is detected.

At time $t_1$, 5.92 is obtained from sd1, 41 is obtained from sd2, −318 is obtained from sd3, and 190 is obtained from sd4. Similar to encoding the state detector data for time $t_0$, the state detector data for time $t_1$ is encoded using the encode keys in FIG. 8A. Accordingly, the resulting signature is 00100001. The generated signature 00100001 is compared with patterns in FIG. 8B . At this stage, the generated signatures from times $t_0$ and $t_1$ matches two of the classified signature in pattern 2 (312). Because the pattern is not completely matched, no failure is detected.

At time $t_2$, 5.67 is obtained from sd1, 38 is obtained from sd2, −317 is obtained from sd3, and 223 is obtained from sd4. Similar to encoding the state detector data for times $t_0$ and $t_1$, the state detector data for time $t_2$ is encoded using the encode keys in FIG. 8A. Accordingly, the resulting signature is 10100001. The generated signature 10100001 is compared with patterns in FIG. 8B . At this stage, the generated signatures from times $t_0$, $t_1$, and $t_2$ matches the pattern 2 (312). Because the pattern is matched, failure 2 is detected and equipment X is immediately stopped.

Those skilled in the art will appreciate that the above is for explanatory purposes only. At any given time multiple pieces of equipment may be simultaneously monitored by state detectors. Each piece of equipment may have many different types of failures that may occur. The signatures may simplify the amount of state detector data to consider when determining whether a failure exists.

FIG. 9

Figure 9:
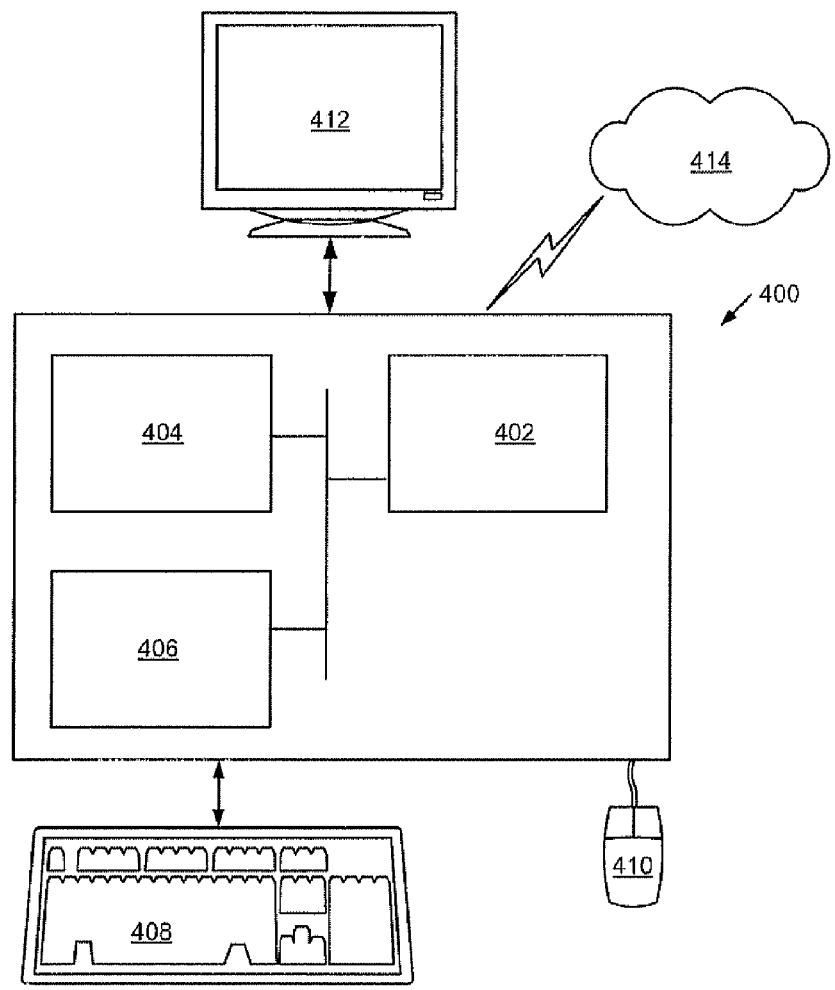
FIG. 9 shows a computer system in accordance with one or more embodiments of the invention.

Embodiments of the invention may be implemented on virtually any type of computer regardless of the platform being used. For example, as shown in FIG. 9, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., data repository, signature generator, signature analyzer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Illustrative Embodiments

In one embodiment, there is disclosed a system comprising at least one piece of equipment; a plurality of sensors adapted to measure one or more operating parameters of the equipment; and a signature generator adapted to encode a plurality of data streams from the sensors into an operating signature for the equipment. In some embodiments, the system also includes a signature repository containing a number of signatures that correspond to known operating conditions of the equipment. In some embodiments, the system also includes an action repository containing a number of actions to be taken which correspond to the signatures in the signature repository. In some embodiments, the system also includes a signature analyzer adapted to compare a signature from the signature generator with a known signature from the signature repository. In some embodiments, the system also includes an event engine adapted to take a predetermined action when a signature from the signature generator matches a known signature from the signature repository. In some embodiments, the signature generator produces a signature comprising at least two of a high, normal, and low range bit string. In some embodiments, the signature generator converts the bit string to a number.

In one embodiment, there is disclosed a method comprising identifying at least one piece of equipment to be monitored; installing a plurality of sensors to measure operating data of the equipment; establishing an operating range for each of the sensors; and creating an encoding key for each of the ranges. In some embodiments, the method also includes converting a plurality of the encoding keys into an operating signature. In some embodiments, the method also includes storing a plurality of known signatures in a database, the signatures corresponding to known operating conditions of the equipment. In some embodiments, the method also includes storing a plurality of actions to take in a database, the actions corresponding to the known signatures. In some embodiments, the method also includes comparing the operating signature with known signatures in the database. In some embodiments, the method also includes taking a predetermined action when the operating signature matches a known signatures in the database. In some embodiments, the method also includes storing a new signature in a database, the signature corresponding to an observed or measured operating condition of the equipment. In some embodiments, the method also includes storing a new action in a database, the action corresponding to a new signature, the new action designed to correct observed or measured operating conditions of the equipment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system comprising:
   at least one piece of equipment;
   a plurality of sensors adapted to measure one or more operating parameters of the equipment; and
   a signature generator adapted to encode a plurality of data streams from the sensors into an operating signature for the equipment; a pattern repository comprising a pattern, wherein the pattern comprises a first nested pattern and a second nested pattern; and a signature analyzer configured to compare the operating signature to the pattern and perform an action based on the comparison and wherein the first nested pattern comprises a classified signature and a frequency specifying a number of occurrences of the classified signature over time.

2. The system of claim 1 wherein the pattern further comprises a sequence definition defining an ordering of the nested patterns.

3. The system of claim 1 wherein the pattern further comprises a sequence definition defining an ordering of the nested patterns.

* * * * *